Patented Apr. 29, 1930

1,756,906

UNITED STATES PATENT OFFICE

CASIMIR A. MIKETTA, OF LOS ANGELES, CALIFORNIA, ASSIGNOR, BY MESNE ASSIGNMENTS, TO CELITE CORPORATION, OF NEW YORK, N. Y., A CORPORATION OF NEW YORK

MATERIAL FOR USE IN TREATMENT OF LIQUIDS

No Drawing. Application filed May 3, 1926, Serial No. 106,562. Renewed September 18, 1929.

The subject of this invention is a novel disintegrated or granular material suitable for the treatment of liquids. One of the objects of the invention is to provide a diatomaceous earth filter aid having enhanced clarifying power at a given rate of flow of liquid therethrough.

Filter aids are generally used to make difficultly filterable liquids more easily manipulated, to increase the rate of flow of such liquids through a filtering apparatus, and to make possible the removal of impurities which were otherwise passing through a filtering surface or preventing the flow of liquid through a filtering surface after a film of such impurities has been formed. The removal of impurities by means of filtration may to a large extent be assumed to be a mechanical straining or screening action. Therefore it is important to consider the size of the impurities which it is desired to remove from the liquid and use a filter aid which is capable of removing such impurities.

My invention may be said to be an improvement upon the U. S. patent application filed by Harry S. Thatcher under Serial No. 46,850. The above application discloses a range of particle sizes and their proportions in a filter aid and my invention also deals with this subject but covers different ranges of particle sizes.

If filtration is assumed to be a mechanical straining or screening process it can then be readily seen that the filter aid should form a filtering surface or cake or layer, the pores of which are sufficiently small to retain the impurities which it is desired to remove from the liquid being filtered. If we desire to remove a very fine material such as precipitated barium sulphate in laboratory work, we use a very fine grade of filter paper which is capable of retaining the fine precipitate. If it is desired to remove a coarse material such as for example precipitated calcium carbonate a more open and loose textured filter paper is used so that the filtration takes place in a shorter time and still removes the precipitate from the liquid. It is therefore seen that finely divided filter aids may be applied to the filtration of industrial liquids and gases in much the same manner, a coarser filter aid which is capable of forming a filter cake of high porosity and relatively large pore space being used where the impurity to be removed is coarse, while a filter aid capable of forming a filter cake containing only small pores will have to be used where the impurity to be removed is very fine or colloidal.

Heretofore, filter aids have been indiscriminately ground so as to contain a large amount of very fine particles which naturally enable the filter aid to form a filter cake or surface having very small pores. These filter aids, although capable of removing very fine or colloidal materials from liquids, gave very low or slow rates of flow inasmuch as they offered a high resistance to the passage of liquid through such fine pores. My invention has for its object the preparation of a filter aid for the removal of very fine colloidal or semi-colloidal impurities without necessitating a slow filtration rate.

I have found that a filter aid may be obtained, capable of giving a high rate of flow and good clarification, having particles ranging in sizes from relatively coarse to the very fine or small, but in such proportions that they do not form a mass of low porosity upon the filtering surfaces of the filtering apparatus. The proportion of particles of given sizes and a selection of the sizes desired, in accordance with this invention, will give a filter aid capable of removing extremely fine suspended impurities and at the same time permit a rapid flow of liquid through a filter cake.

Filter aids used heretofore have been in a finely divided condition and of necessity contained particles of various sizes some of which were fine and others coarse. Usually the amount of coarse material was controlled; for example, when diatomaceous earth filter aids were being prepared not more than about 10% has been allowed to remain on a 150 mesh sieve. Under the above system no one knew what 90% of the filter aid was composed of and what function it performed in the filtration operation. I have found definite limitations upon the particle sizes and quantities thereof which will enable anyone to prepare a filter aid of predetermined and desirable characteristics.

Upon assuming that a filter aid contains particles of a certain average dimension, size, mass or sedimentation characteristic (hereafter more fully defined) say D, I have found that a good filter aid is one composed of not more than 15% by weight of particles having an average dimension of 5D or larger or its equivalent, not more than 25% by weight of particles having an average dimension of 1D or smaller or its equivalent, and containing at least 60% by weight of particles between 1D and 5D in average dimension.

In the above specification for preparation of a filter aid comprising particles of certain sizes or characteristics, I have used an arbitrary unit or dimension which I have designated as D. This unit will change in the preparation of various filter aids for various purposes but in a general way the dimension or unit D may be assumed to be dependent upon the average dimension of the finest particle or colloid which it is desired to remove from the liquid to be filtered. It is to be remembered that the particles or impurities may be rigid or they may be semi-solids capable of distortion. For example, in the filtration of raw sugar juices there are certain gummy and colloidal impurities in the form of gels, gums, and waxes (in addition to coarser impurities such as fiber shreds and other materials) which must be removed to give clarity and accomplish purification. In designing a filter aid to remove such impurities and to perfectly clarify a raw sugar solution a filter aid is prepared in accordance with the specification outlined above in which D is given a dimension of 2 microns or 0.002 mm. The complete filter aid made in accordance with my invention contains not more than 15% by weight of particles having an average dimension of, or sedimentation characteristics equivalent to those of a particle of 10 microns or larger, not more than 25% by weight of particles having an average dimension of two microns or smaller, and contains at least 60% of material having particles between 2 microns and 10 microns in average dimension.

As has been said before the actual size of the particles composing the filter aid prepared in accordance with my invention will depend upon the liquid being treated, the individual size and structure of the particles or impurities which it is desired to remove from the liquid, and the work or efficiency required of the filter aid. For example, in the preparation of the filter aids in the industrial liquids such as sugars, syrups, chemical solutions, and oil, I have found that the particles designated as 1D (the unit upon which the filter aid is designed) need not be smaller than 2 microns in average dimension or sedimentation characteristic and, when only coarse impurities are to be removed, may be as large as 10 microns or 0.01 mm. For general purposes where a high degree of clarification is desired and the resulting filtrate is to be absolutely clear and show practically no Tyndall effect a filter aid based on 1D equal to 2 microns is very satisfactory, and precludes the necessity of making a large variety of filter aids differing but slightly from each other.

I have made certain filter aids from diatomaceous earth and tested them by actual use on 60° Brix raw sugar solutions containing very fine suspended impurities and collodial materials, in a standard plate and frame filter press. The raw sugar solution was kept at 80° C. in all of the tests so as to harmonize with sugar refinery practice and 0.2% of filter aid on the weight of sugar in solution was added to the liquid being filtered in all instances. The results which I have obtained and the materials which I used are disclosed in the following table:

| Particle size analysis | Per cent by weight of material | | | |
| --- | --- | --- | --- | --- |
| | A | B' | B² | B³ |
| Larger than 10 microns | 28% | 2.5% | 5% | 2.5% |
| 8–10 microns | 6 | 4.8 | 3 | 4.5 |
| 6–8 microns | 8 | 19.5 | 11 | 18.0 |
| 4–6 microns | 13 | 40.2 | 29 | 38.5 |
| 2–4 microns | 20 | 18.5 | 42 | 20.0 |
| Smaller than 2 microns | 25 | 14.5 | 10 | 16.5 |
| Rate of flow, gallons per sq. ft. per hr. | 4.5 | 11.7 | 12.6 | 10.0 |
| Filtration rating | 100% | 260% | 281% | 224% |
| Clarity of filtrate | Brilliant | Brilliant | Very clear | Brilliant |

Filter aid A representing an improved type of diatomaceous earth filter aid now on the market and containing more than 15% of 10 micron particles was used for comparison with my products B', B², and B³, which fall within the limitations established by me. It will be noticed that the rate of flow or speed of filtration was from 2.25 to 2.8 times that obtained with the standard and, at the same time, satisfactory clarification was obtained.

From the above table it will be noted that my products B', B², and B³ which represent specific embodiments of the invention contain less than 25% of material smaller than 2 microns (1D) and a minimum of 10% of such material, and less than 15% of material coarser than 10 microns (5D) and a minimum of 2.5% of such coarse material.

The economic importance of my invention may be appreciated by conceiving that by the use of my improved filter aids, the filtering capacity of a plant is more than doubled. Longer filtration cycles are possible, more liquid is filtered before the filter bed is clogged, and less washings or cleaning of pressure filters is required, thereby reducing the labor costs and losses in the filter cakes.

In the above examples I have described the application of my invention to filter aids made from diatomaceous earth (also known as kieselguhr, tripoli, infusorial earth, etc.). Similar results may be obtained however by using other filtering and decolorizing agents, such as carbons, bone blacks, fuller's earth, bleaching clays, zeolites or water softening agents, and various other materials of similar properties. These materials may be calcined or activated in any suitable manner or they may be used in their natural condition, for example, the diatomaceous earth may be calcined before being made into a filter aid in accordance with my invention. Chemical or physical products, for example, a calcium silicate made by treating diatomaceous earth with lime may also be prepared in accordance with my invention and used for filtration or decolorization.

Although decolorizing materials cannot be strictly classified as filter aids, their physical action is very similar to that of filter aids. For example, where a decolorizing agent such as a carbon is used, the carbon is generally added to the liquid to be decolorized and then removed from the liquid by means of filtration. It is seen therefore that filtration is a necessary operation even when decolorizing materials are used and the classification of particles of a decolorizing agent so as to permit a more rapid rate of flow than is now being obtained, enables larger quantities of liquid to be treated in a much shorter time and thereby increases the efficiency and the capacity of the decolorizing operation. Heretofore decolorizing carbons were of such heterogeneous particle size that they resisted filtration and hampered the flow of liquids through a filtering apparatus. When such decolorizing carbons are made in accordance with my invention they contain a sufficient amount of fine particles to produce a material having a high surface area and therefore a large amount of surface capable of adsorbing coloring materials and are still capable of forming a sufficiently porous filter cake to enable a liquid to pass therethrough rapidly.

Filtering materials made in accordance with my invention may be used in all types of filtering apparatus but the greater benefits are obtained when they are used on pressure or vacuum filters. Filtration by gravity is necessarily slow and is only economical in certain specialized cases, such as filtration of sewage for example. When filtering materials or decolorizing agents are separated from the liquids being treated by sedimentation the full value of my invention is not obtained, but improvements are noticeable.

In determining the particle sizes of a filter aid and their proportional amount I have found sedimentation and microscopic methods most accurate. In determining the sizes and proportions of such small particles by means of sedimentation methods I have found the method evolved by Oden most satisfactory. In this method a certain weight of the finely divided filter aid is put in suspension in a certain quantity of distilled water and the actual amount of particles settling out of such suspension is weighed and the proportion of particles by different sizes calculated therefrom. All particles that settle in the distilled water at a definite temperature are assumed to settle in accordance with Stokes's law. For this reason wherever the average diameter or dimension of a particle is given by me I am not to be limited to an isotropic or spherical particle, but the specification should be interpreted so as to include any isotropic or anisotropic particle capable of behaving as a spherical particle, of the size given, in accordance with Stokes' law. For example, where I have spoken of particles having an average diameter of two microns I mean to include any particle having the same rate of settling in distilled water as a spherical particle two microns in diameter, composed of material of the same specific gravity, under similar conditions. Furthermore, the errors incidental in such work should be considered and the limits imposed by me on the size of the particles should be viewed leniently for this reason. The method described by The Svedberg in his "Colloid Chemistry" (American Chemical Society Monograph, pages 136–146) may be used in determining the finer particle sizes, and standard sieves for the larger sizes. The term "average dimension" has been used in this specification for the sake of simplicity and ease of description; but the limitations defining my invention may be stated as follows: In all instances not more than 25% of the material (by weight) should be composed of particles having slower sedimentation characteristics (or rate of settling under standard conditions) than that of a spherical particle of an assumed unit diameter and of the same specific gravity; not more than 15% of the material should be composed of particles having faster sedimentation characteristics than that of a spherical particle having five times the diameter of the assumed unit dimension and of the same specific gravity, and should contain at least 60% of particles having sedimentation characteristics of spherical particles of between one and five times said unit dimension.

I wish to call attention however to the important rôle played by particle shape. Spicular or elongated particles form, as a rule, much more effective filter aids than isotropic or spherical particles. This can be readily appreciated if we conceive a filter cake made of anisotropic or spicular particles, as such cake would have higher porosity than a cake made of spherical or isotropic particles. But as indicated above, I wish to embrace both isotropic and anisotropic particles in this invention within the limitations described.

My invention is not dependent upon a definite, single method for the manufacture of filter aids or decolorizing agents containing the gradations of the particles disclosed herein, and any process of making a product of the particle classification specified may be used. I have found that air separating equipment of accepted construction and design may be adapted to the manufacture of diatomaceous earth and other filter aids containing proportions and sizes of particles disclosed by me. The use of electric precipitators for the removal of excess quantities of fine particles or of the coarse particles, the use of washing or water settling operations in the manufacturing process, the use of electro-osmotic processes, and the use of coagulants or flocculating agents in water settling operations may be embraced in the manufacture of filter aids disclosed by me.

What I claim is:

1. A divided material comprising not more than 25% by weight of particles smaller in average dimension than an assumed unit of dimension, not more than 15% by weight of particles larger in average dimension than five times such unit, the remainder being composed of particles of from 1 to 5 unit dimensions.

2. A disintegrated material comprising not more than 25% by weight, of particles smaller in average dimension than an assumed unit of dimension, not more than 15% by weight of particles larger in average dimension than five times said unit and at least 60% by weight of particles having an average dimension of between one unit and five times said unit.

3. A divided material adapted for use as a filtering material and the like comprising not more than 25% by weight of particles smaller than an assumed spherical particle of unit diameter, nor more than 15% by weight of particles larger than an assumed spherical particle of five times such unit diameter, the remainder being composed of particles of from 1 to 5 unit dimensions, the dimensions being determined by the sedimentation characteristics of the particles.

4. A finely divided diatomaceous earth filtering material comprising not more than 25% by weight of particles smaller than an assumed spherical particle of unit diameter, nor more than 15% by weight of particles larger than an assumed spherical particle of five times such unit diameter, the remainder being composed of particles of from one to five unit dimensions, the dimensions being determined by the sedimentation characteristics of the particles.

5. A product as defined in claim 4 wherein the length of said unit diameter is 0.002 mm.

6. A product as defined in claim 4 wherein the length of said unit diameter is not less than 0.002 mm. or more than 0.01 mm.

7. A finely divided diatomaceous earth product comprising between about 25% to 10% by weight of particles smaller than 2 microns in diameter, and not more than 15% by weight of particles larger than 10 microns in diameter, the remainder being composed of particles of from 2 to 10 microns in diameter, the dimensions being determined by the sedimentation characteristics of the particles.

8. A finely divided diatomaceous earth product comprising between about 25% to 10% by weight of particles smaller than 2 microns in diameter, and between about 15% to 2% by weight of particles larger than 10 microns in diameter, the remainder being composed of particles of from 2 to 10 microns in diameter, the dimensions being determined by the sedimentation characteristics of the particles.

9. A divided material of the character described comprising not more than about 15% by weight of particles smaller than an assumed spherical particle of unit diameter, nor more than about 10% by weight of particles larger than an assumed spherical particle of 5 times such unit diameter, the remainder being composed of particles of from 1 to 5 unit dimension, the dimensions being determined by the sedimentation characteristics of the particles.

10. A material as defined in claim 9 wherein the unit of dimension is 0.002 mm.

11. A material as defined in claim 9 wherein the unit of dimension is not less than 0.002 mm. or more than 0.01 mm.

12. A divided material of the character described comprising not more than 15% by weight of particles smaller than an assumed spherical particle of unit diameter, nor more than about 5% by weight of particles larger than an assumed spherical particle of 5 times such unit diameter, the remainder being composed of particles of from 1 to 5 unit dimension, the dimensions being determined by the sedimentation characteristics of the particles.

13. A material as defined in claim 12 wherein the unit of dimension is 0.002 mm.

14. A finely divided product as defined in claim 12 wherein the unit of dimension is not less than 0.002 mm. or more than 0.01 mm.

15. A finely divided product derived from diatomaceous earth, comprising not more than 15% by weight of particles smaller than an assumed spherical particle of unit diameter, nor more than about 10% by weight of particles larger than an assumed spherical particle of 5 times such unit diameter, the remainder being composed of particles of from 1 to 5 unit dimension, the dimensions being determined by the sedimentation characteristics of the particles.

16. A finely divided product as defined in claim 15 wherein the unit of dimension is 0.002 mm.

17. A finely divided product derived from diatomaceous earth, comprising not more than 15% by weight of particles smaller than an assumed spherical particle of unit diameter, nor more than about 5% by weight of particles larger than an assumed spherical particle of 5 times such unit diameter, the remainder being composed of particles of from 1 to 5 unit dimension, the dimensions being determined by the sedimentation characteristics of the particles.

18. A finely divided product as defined in claim 17 wherein the unit of dimension is 0.002 mm.

In testimony that I claim the foregoing as my own, I affix my signature.

CASIMIR A. MIKETTA.